April 18, 1933.    H. PLIES    1,904,695

EPIDIASCOPE

Filed Jan. 18, 1930

Heinrich Plies
Inventor

By his Attorney
Ivan E. C. Konigsberg

Patented Apr. 18, 1933

1,904,695

UNITED STATES PATENT OFFICE

HEINRICH PLIES, OF WETZLAR, GERMANY, ASSIGNOR TO ERNST LEITZ OPTISCHE WERKE, OF WETZLAR, THURINGIA, GERMANY, A CORPORATION OF GERMANY

EPIDIASCOPE

Application filed January 18, 1930, Serial No. 421,785, and in Germany January 31, 1929.

This invention relates to improvements in epidiascopes or projecting apparatus. The object of the invention is to provide certain improvements comprising curved side mirrors or reflectors whereby to increase the intensity of the illumination of the object.

Another object of the invention is to provide cooling means or a fan for keeping the apparatus cool and circulate fresh air therethrough.

In the accompanying drawing which is almost entirely in the form of a diagrammatic illustration of the invention.

Figure 1:
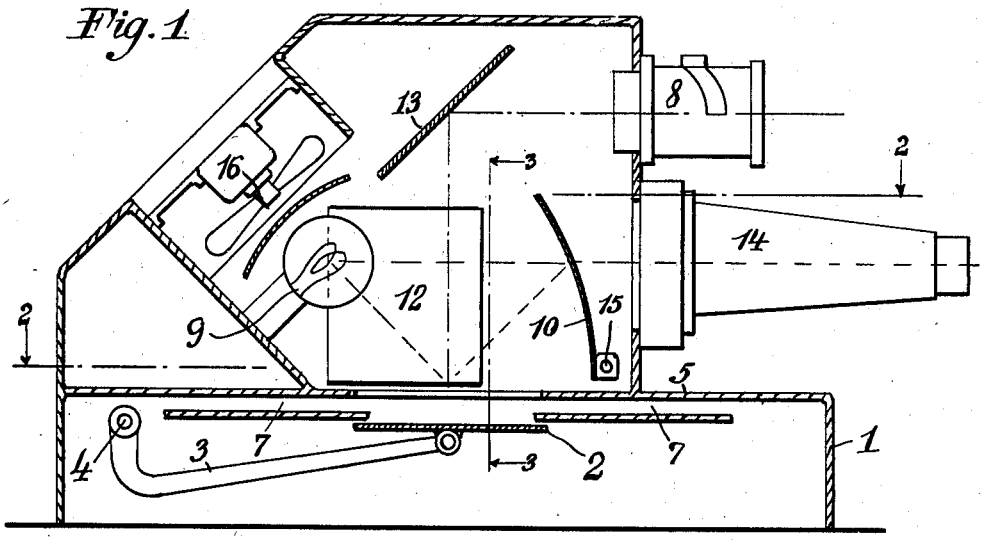
Fig. 1 is a central longitudinal sectional view through an apparatus embodying the invention.
Figure 2:
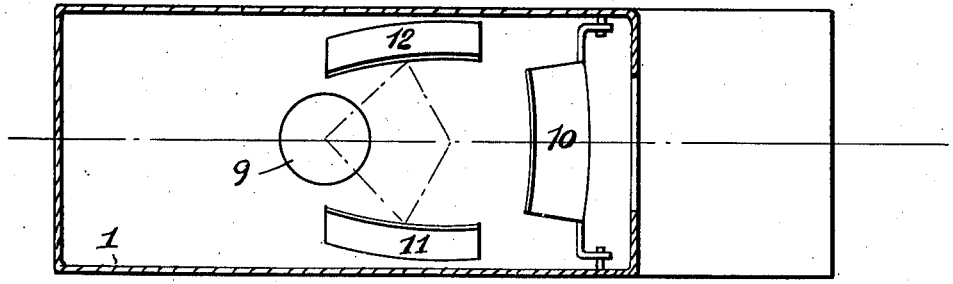
Fig. 2 is a horizontal sectional view on the line 2—2 of Figure 1 with parts omitted.
Figure 3:
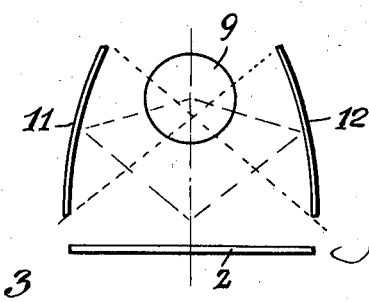
Fig. 3 is a vertical sectional view with parts omitted.

Referring to the drawing the reference numeral 1 denotes a casing in which the several parts are mounted and contained. The object or specimen to be projected episcopically is laid on a stage 2 which is supported on a lever 3 pivoted at 4 for raising and lowering the stage to place or remove the specimen or object.

The bottom of the casing is formed by a floor 5 having an opening for the stage and underneath the floor there are mounted suitable baffle plates or the likes forming air ways or channels 7, 7.

The projection is done episcopically through suitable focussing lenses mounted as usual in a casing 8, the object being projected by means of a light source 9 from which the rays are directed towards the opposite reflector 10 and the two side reflectors 11 and 12. The picture is then thrown upwards against the upper reflector 13 and thence to the lenses at 8.

A material increase in the intensity of the illumination is obtained by the use of curved side reflectors having a curvature substantially equal to or the same as the curvature of the front reflector 10. Greater efficiency is also obtained by mounting the curved side reflectors with their focal points below the horizontal plane through the center of the light source as shown so that their radiating area equals the size of the episcopic object. Another feature of the invention resides in the fact that the focal lengths of the curved side reflectors is made at least equal to the focal length of the episcopical objection. Because of these improvements, material increase in the intensity of the illumination of the object on the stage is obtained in that the curved reflectors distribute all of the reflected light equally.

Lantern slides may be projected through the usual lens mounting 14 by lowering the reflecting surface or mirror 10 which is pivoted at 15.

A suction fan 16 is suitably mounted in the casing 1 and draws fresh cool air through the apparatus from the bottom thereof through the air ways 7, 7.

The apparatus as herein disclosed is very efficient in operation and is kept cool by the fan so that danger of injury from overheated parts are eliminated.

The arrangement of reflectors is such that the projection is far superior to other apparatus which does not have the side reflectors.

I claim:—

In an epidiascope a housing having an exposure opening in the bottom thereof, means for supporting an object to be exposed through said opening from below the same, a lamp mounted above said opening to one side thereof, a plurality of projection devices mounted in said housing opposite said lamp, means for reflecting the light from the lamp to one of said projection devices comprising a concave light reflector mounted on each side of said exposure opening and facing the same, a third pivotally mounted concave light reflector facing said lamp and exposure opening, and a fourth angularly disposed reflector mounted above the said exposure opening for the purposes set forth.

Signed at Frankfort-on-the-Main, Germany, this 2d day of January A. D. 1930.

HEINRICH PLIES.